(12) United States Patent
Yoshizoe

(10) Patent No.: US 7,136,134 B2
(45) Date of Patent: Nov. 14, 2006

(54) METHOD FOR MANUFACTURING LIQUID CRYSTAL DISPLAY PANEL USING AN AUXILIARY AIR OUTLET

(75) Inventor: Hidefumi Yoshizoe, Izumi (JP)

(73) Assignee: NEC LCD Technologies, Ltd. (JP)

( * ) Notice: Subject to any disclaimer, the term of this patent is extended or adjusted under 35 U.S.C. 154(b) by 5 days.

(21) Appl. No.: 10/629,185

(22) Filed: Jul. 29, 2003

(65) Prior Publication Data

US 2004/0021822 A1 Feb. 5, 2004

(30) Foreign Application Priority Data

Jul. 29, 2002 (JP) ............................. 2002-219824

(51) Int. Cl.
*G02F 1/1341* (2006.01)
*G02F 1/1339* (2006.01)

(52) U.S. Cl. ...................... 349/154; 349/153; 349/189; 349/190

(58) Field of Classification Search ................ 349/153, 349/154, 189, 190
See application file for complete search history.

(56) References Cited

U.S. PATENT DOCUMENTS 5,410,423 A * 4/1995 Furushima et al. ......... 349/190
5,858,482 A * 1/1999 Ishiwata et al. ........... 428/1.53
6,222,603 B1 * 4/2001 Sakai et al. ................ 349/153
2001/0022645 A1 * 9/2001 Lee et al. ................... 349/153

* cited by examiner

*Primary Examiner*—Andrew Schechter
(74) *Attorney, Agent, or Firm*—Hayes Soloway P.C.

(57) ABSTRACT

Disclosed is a panel assembling process concerning a suitable pattern of seal material interposed between facing substrates which is designed for adopting a liquid crystal injection method. The seal material has two groups. The first group is formed to provide an internal space to be filled with the liquid crystal for display area. The second group is formed around the first group to reinforce it during a panel cutting process. The second group as reinforcing members is arranged such that air within the internal space can be easily discharged via a short air outlet route between a peripheral end of the panel and an injection inlet formed in the first group as a seal member. Particularly, an air outlet forming member connected to an injection inlet of the seal member is elongated to the peripheral end of the panel, and an air outlet auxiliary member constituting an air outlet is formed within the air outlet forming member to prevent deformation of the air outlet.

24 Claims, 4 Drawing Sheets

METHOD FOR MANUFACTURING LIQUID CRYSTAL DISPLAY PANEL USING AN AUXILIARY AIR OUTLET

FIELD OF THE INVENTION

The present invention relates to a method for manufacturing a liquid crystal display (LCD) panel and more particularly, to a manufacturing method for LCD panels designed for adopting a liquid crystal injection method.

BACKGROUND OF THE INVENTION

FIG. 1A and FIG. 1B are schematic drawings for illustrating a manufacturing method of liquid crystal display panels with a plurality of reinforcing members for panel-cutting process prior to a liquid crystal injection process according to a related art, where FIG. 1A is a plan view, and FIG. 1B is a cross-sectional view taken along line I—I shown in FIG. 1A.

Referring to FIG. 1A and FIG. 1B, a sealing member 3 and auxiliary members 13 as reinforcement members are arranged between a lower substrate 1 having pixel electrodes and an upper substrate 2 having color filter. The sealing member 3 has a frame-shaped pattern with a pair of injection inlets 6 to provide an internal space 5 to be filled with liquid crystal material through the inlets 6. The auxiliary members 13 are designed to have L-shaped pattern or square-bracket pattern for preventing the deformation of the sealing member 3 during the panel-cutting process. These members 3 and 13 are formed on either one of the substrates 1 and 2 by screen-printing such resin as epoxy resin prior to a panel alignment process including a lamination process and heating process for curing the resin.

Following the panel alignment process, the two substrates 1 and 2 are cut off along a first cut line 21, indicated by a two-dot chain line, whereby unnecessary peripheral portions including the auxiliary members 13 are severed from a display region.

Additionally, if necessary, one substrate can be cut off along a second cut line 22, indicated by a one-dot chain line to provide a open space allowing easy connecting process between the panel terminals and external connecting leads such as a flat cable.

A panel thus formed is placed into a vacuum chamber, and liquid crystal is injected into the internal space 5 through the injection inlets 6. After the liquid crystal is injected into the internal space 5, the injection inlets 6 are sealed by a sealing material such as epoxy resin.

During the panel assembly process, the auxiliary members 13 act to prevent the seal member from being deformed when the panel is cut, and also function as reinforcements for maintaining the panel gap at a constant level.

In the panel cutting process, cut line is scribed on the surface of the panel along the cut line 21 positioned between the seal member 3 and the auxiliary members 13, and then pressure is applied to the panel to sever the peripheral region of the panel from the seal member 3. Since the auxiliary members 13 act as reinforcements to the seal member 3 to support the two substrates, the auxiliary members act to lessen the deformation force applied to the seal member 3.

As mentioned above, a plurality of auxiliary members 13 are employed to prevent deformation of the seal members 3 during the panel-cutting process. As such, the seal member 3 is surrounded by the square-bracket-shaped auxiliary members 13, each having approximately the same length as the area forming the internal space 5. Subsequently, in the aligning process of the lower and upper substrates 1 and 2, which is performed under low pressure and high temperature conditions, the route for thermally expanded air in the internal space 5 to flow out to the panel edge 7 is long, and thus prevents air within the internal space 5 to be released easily. As a result, pressure difference is generated between the inside and outside of the internal space 5, thereby causing the cell gap (G) to be enlarged, and cause damage or deformation to the seal member 3.

SUMMARY OF THE INVENTION

In the present invention, a pattern of reinforcing auxiliary members are arranged around of the seal members such that air within the internal space can be naturally discharged and an air outlet route between an injection inlet and a peripheral end of the panel can be shortened.

Particularly, an air outlet forming member is connected to an injection inlet of a seal member and is elongated to a peripheral end of the panel. Additionally, an air outlet auxiliary member is formed within the air outlet forming member to prevent deformation of an air outlet.

Furthermore, a process in the manufacturing of a liquid crystal display panel comprises attaching a first substrate to a second substrate with a seal member and an auxiliary member to form a panel, the seal member forming a internal space and having an injection inlet for liquid crystal injection, the auxiliary member being arrayed around the seal member, wherein the seal member is formed with an air outlet forming member connected to the injection inlet, the air outlet forming member is extended toward a peripheral end of the panel, and the air outlet forming member is formed therein with an air outlet auxiliary member for forming an air outlet. Additionally, a cut line is positioned between the seal members and the auxiliary members. Also a process of cutting the panel for traversing the air outlet forming member and a process of injecting the liquid crystal from the injection inlets are included.

One embodiment of this invention requires that the air outlet auxiliary members are positioned between the cut line and the peripheral end of the panel in order not to be cut. Furthermore, the liquid crystal display panel is formed such that the air outlet auxiliary member and the air outlet forming member are maintained in a predetermined interval such that both members can be extended in parallel.

The air outlet auxiliary member and the air outlet forming member also may be extended to a peripheral end of the panel or may end in the vicinity of the peripheral end of the panel.

Furthermore, the auxiliary member, the air outlet auxiliary member, and the air outlet forming member positioned at an external domain of the cut line may be continuously formed on the dashed lines.

The same embodiment further requires that the seal members, the auxiliary members, the air outlet auxiliary member, and the air outlet forming member are formed at the same time and made of the same material.

The embodiment also has an interval between the air outlet auxiliary member and the air outlet forming member that should be set up to be at least 2 mm but not more than 7 mm. It is preferred that a distance between the peripheral end of the panel and the distal ends of both the air outlet auxiliary member and the air outlet forming member is not more than 3 mm.

The number of the injection inlets and the air outlet installed may be one or more.

Furthermore, according to an embodiment of the present invention, a liquid crystal display panel may be obtained by any one of the above-mentioned methods.

A method for manufacturing a liquid crystal display panel comprises forming a internal space on a first substrate by a seal member having an injection inlet of liquid crystal, forming an air outlet member mounting on an air outlet of the shortest route from the injection inlet to the peripheral of the panel, and bonding the first and the second substrates with the seal member.

An embodiment requires that the air outlet reach the peripheral end of the panel, or at least an interval distance of not more than 3 mm between the distal end of the air outlet and the peripheral end of the panel.

Furthermore, it requires that a longer auxiliary member face the seal member in three directions excluding only the injection inlet side. It also requires that a distal end of the longer auxiliary member in the three directions is not more than 3 mm from the peripheral end of the panel facing the same.

Therefore, an increase in pressure in the internal space as well as in the gap between the substrates outside of the internal space can be avoided, and deformation of the seal members can be prevented.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1A:
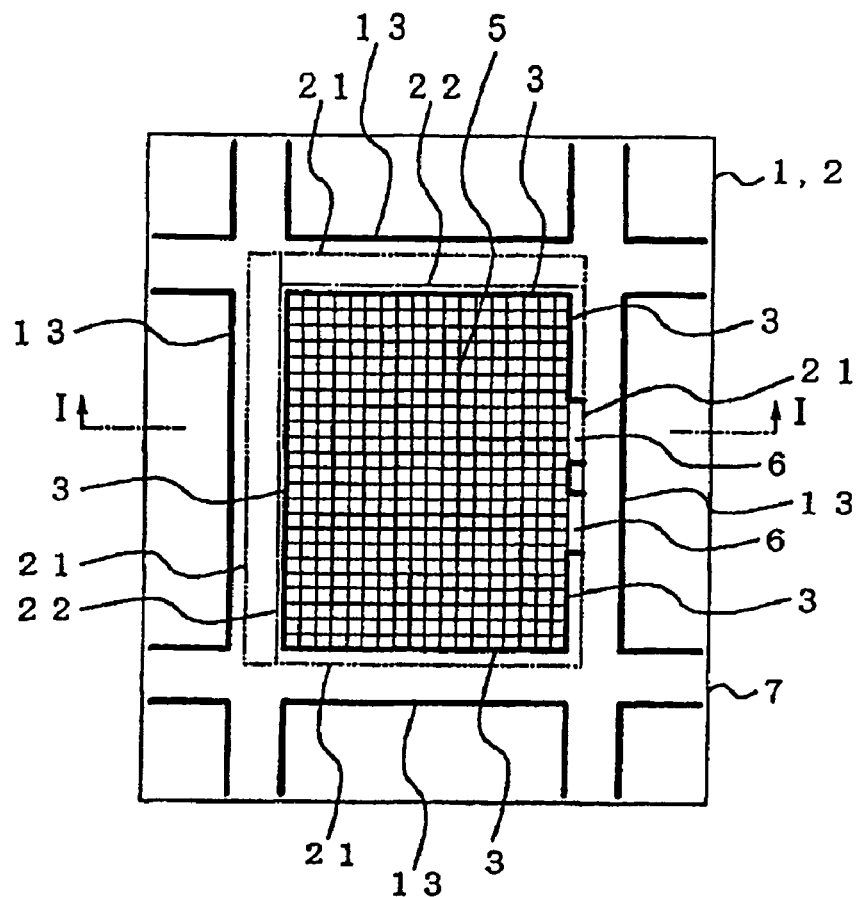
FIG. 1A is a plan view for illustrating a related art.
Figure 1B:
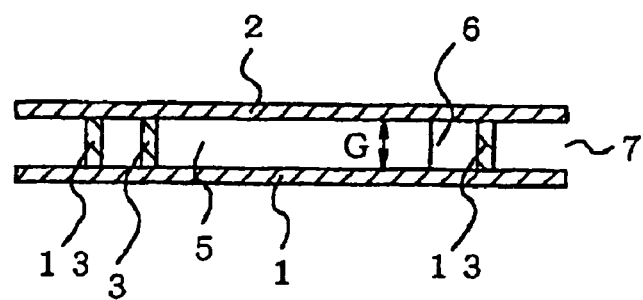
FIG. 1B is a cross-sectional view of the related art taken along line I—I of FIG. 1A.
Figure 2:
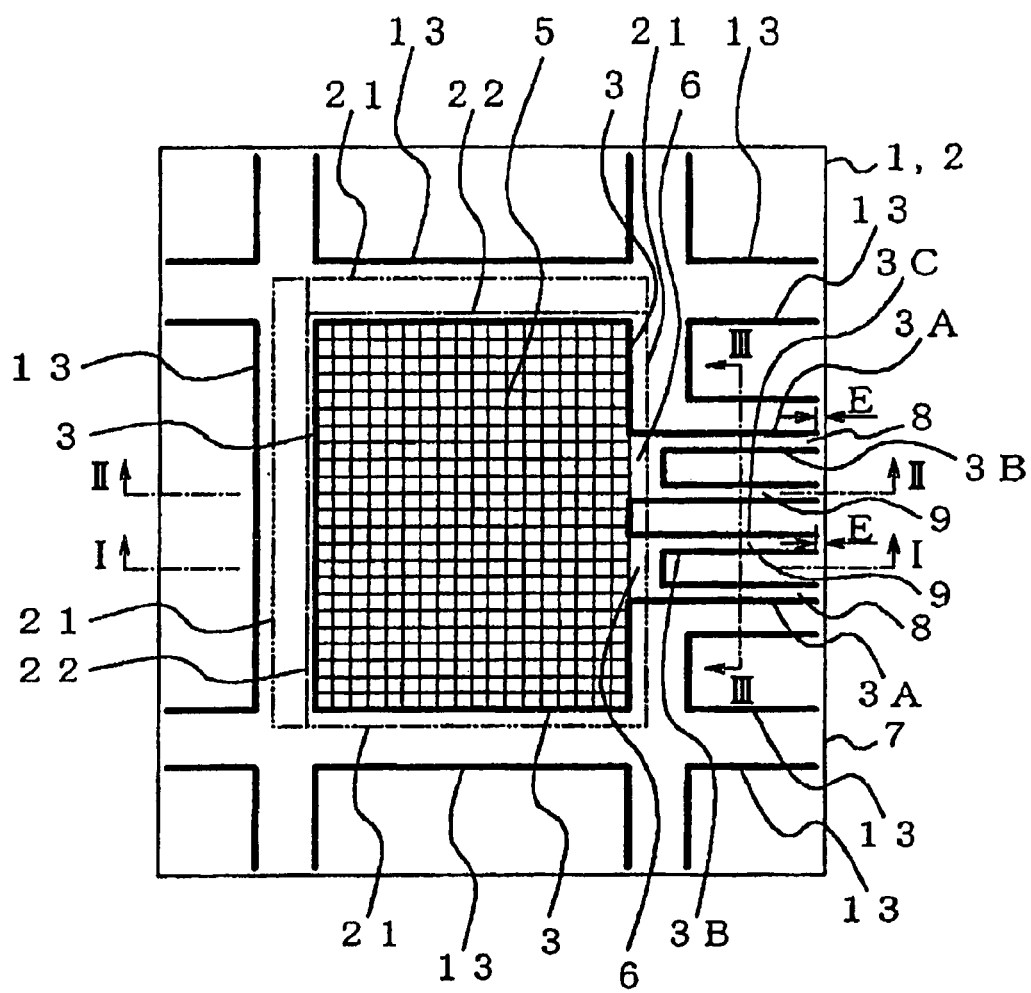
FIG. 2 is a plan view for illustrating one embodiment of the present invention.

In one embodiment of the present invention as illustrated in FIG. 2, a seal member 3 and a plurality of auxiliary members 13 are formed such that an air outlet route between an injection inlet 6 and a panel peripheral end 7 is arranged to be at a shortest distance. In the example shown in FIG. 2, two injection inlets 6 are formed on the same side and seal member 3 formed at each injection inlet, respectively, are extended in parallel from the injection inlets 6 towards the peripheral end 7 to form air outlet members 3A and 3C. An auxiliary member 3B for reinforcement of the air outlet is formed inside each air outlet route in a "U" shape, and two air outlets 8 and 9 are formed in relation to each injection inlet.

As depicted in FIG. 2, a cut line 21 of the panel is positioned between the injection inlet 6 and the auxiliary member 3B for reinforcement of the air outlet. Also, the air outlet members 3A and 3C are formed to traverse the cut line 21. As with the prior art, the three sides other than the injection side are surrounded by a plurality of auxiliary members 13 having L-shaped pattern or square-bracket pattern.

In FIG. 2, since a peripheral end of a first substrate 1 and a peripheral end of a second substrate 2 are accorded therebetween, the peripheral end 7 of the panel is determined by the same peripheral ends of the first and second substrates. When the peripheral end of the second substrate is situated inside the peripheral end of the first substrate, the peripheral end of the second substrate is considered the peripheral end 7 of the panel. Alternatively, when the peripheral end of the first substrate is positioned inside the peripheral end of the second substrate, the peripheral end of the first substrate is considered the peripheral end 7 of the panel.

The seal member 3, the auxiliary members 13, and the air outlet members 3A, 3B and 3C are simultaneously formed on the first substrate by patterning thermosetting epoxy resin. Patterning techniques for such resin is carried out by using screen printing method or etching method such as photolithographic technique. Thickness of those members is determined to provide a cell gap (G) of 3 µm–5 µm after the curing process of the seal material using thermosetting.

As a result, the seal member 3, the auxiliary members 13 and the air outlet members 3A, 3B and 3C are made of the same material and have the same thickness. A pair of air outlets 8 respectively include air outlet members 3A and 3B each having a length that extends from the injection inlet 6 to the peripheral end 7 or to an approximate distance (E) from the peripheral end 7, as shown in FIG. 2. Likewise, a pair of air outlets 9 respectively includes air outlet members 3B and 3C, each having a length similar to the air outlets mentioned above.

Due to the short distance of the air outlets 8 and 9 which extend from the injection inlets 6 to the peripheral end 7 or to an approximate area thereof, respectively, the route of thermally expanded air can be discharged relatively quickly toward the peripheral end 7 during the cure process of the seal members by heating. As a result, air discharge in the internal space 5 can be carried out smoothly.

This smooth discharge minimizes the pressure difference between the inside and outside of the internal space 5, thus enabling the maintenance of the predetermined size of cell gap (G) and preventing deformation or damage to the seal members.

Figure 3A:
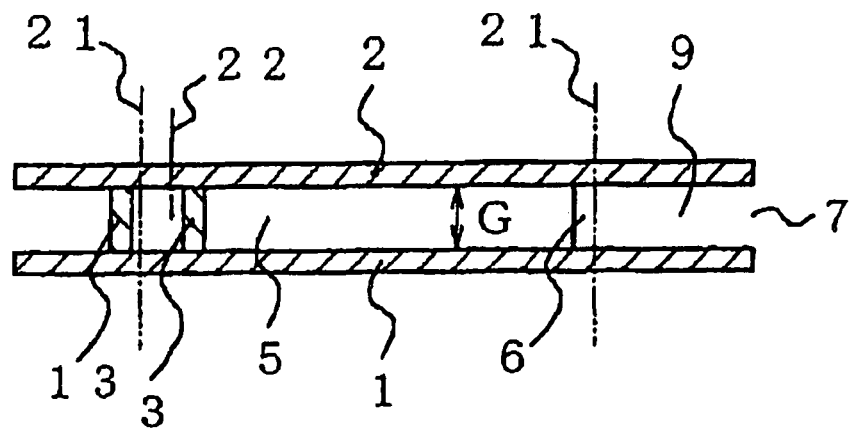
FIG. 3A is a cross-sectional view taken along line II—II of FIG. 2.
Figure 3B:
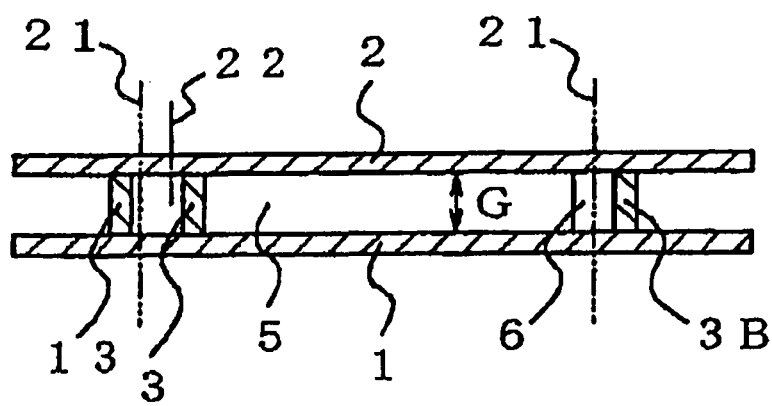
FIG. 3B is a cross-sectional view taken along line I—I of FIG. 2.
Figure 3C:
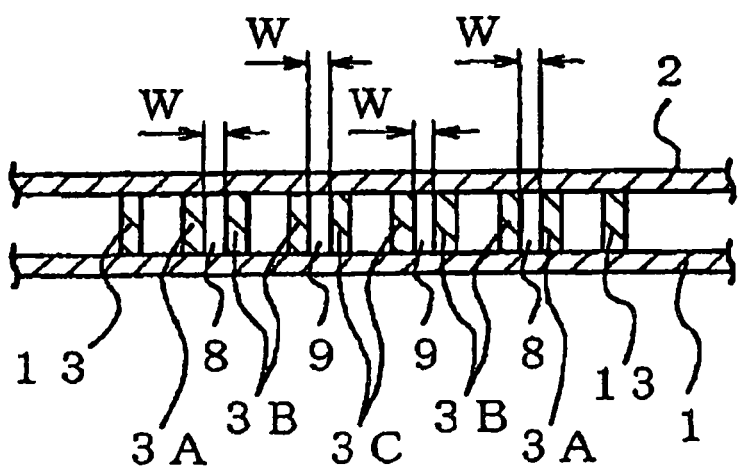
FIG. 3C is an enlarged cross-sectional view taken crosswise along line III—III of FIG. 2.

Referring to FIG. 3C, if the air outlets 8 and 9 are too narrow in width (W), the air outlets cannot effectively function as discharge routes for the thermally expanded air, and if the air outlets are too wide, the gap between the substrates, equivalent to the cell gap (G) in the internal space 5, may squeeze together to close the discharge route for the thermally expanded air. Thus, it is preferred that the width (W) of the air outlets 8 and 9 is 2 mm or more, but not more than 7 mm.

Furthermore, if an interval (E) between the distal ends of the air outlets 8 and 9 and the peripheral end 7 is too wide, the gap between the substrates thereat may become narrow and might result in the closing of the air outlets from the thermally expanded air.

Therefore, it is preferred that the interval (E) between the distal ends of the air outlets 8 and 9 and the peripheral end 7 be not more than about 3 mm.

Additionally, the other three sides of the panel are formed with a longer auxiliary member facing the seal member, and it is preferred that the interval (E) between the distal ends of the longer auxiliary members and the peripheral end also be not more than 3 mm from the peripheral end. These 3 mm tolerances help reduce the pressure between the substrates, inside as well as outside the internal space, thereby preventing deformation of the seal members.

Both substrates are cut off along the first cut line 21, as illustrated in FIG. 2, FIG. 3A and FIG. 3B, indicated by two-dot chain lines. This cut-off process eliminates unnecessary parts including the auxiliary members 13 outside of the seal members 3 (i.e., parts except for the liquid crystal display panel).

Furthermore, one substrate may be cut along a second cut line 22, shown by one-dot chain lines, if necessary, to obtain a structure for allowing easy connecting process between the panel terminals and external connecting leads such as a flat cable.

The semi-processed liquid crystal display panel obtained thus far is next inserted into a closed vessel such as a vacuum chamber, in which the pressure is reduced. Thereafter, liquid crystal, for example, a smectic liquid crystal material, is inserted into the internal space 5 through the injection inlet 6. Following the insertion of the liquid crystal material, the injection inlet 6 is closed with a seal material such as epoxy resin.

Although omitted in the drawings, a typical example of the first substrate 1 used is a transparent substrate which is formed with a plurality of transparent electrodes as pixel electrodes, an insulating layer and an alignment layer in which a rubbing treatment is conducted thereon. A typical example of the second substrate 2 used is a transparent substrate which is formed with a color filter, a protective layer, a plurality of transparent electrodes, an insulating layer and an alignment layer in which a rubbing treatment is done thereon. These transparent substrates can be glass plates with thickness of about 0.5 mm–0.7 mm, epoxy-based plastic plates, or acryl-based plastic plates.

In the case of a transmission type liquid crystal display panel according to a simple matrix driving method, the first and the second substrates face each other so that stripe-shaped transparent electrodes on both substrates can be orthogonally arrayed, and the seal member 3 is cured to form an internal space 5 which becomes a display area. The seal member 3 is formed with an injection inlet 6 as an opening for penetrating the inside and outside of the internal space 5.

Although the present embodiment has been described as a simple matrix type liquid crystal display panel, the present invention is by no means limited to this embodiment, and various modifications may be made within the scope of the present invention. In the case of a liquid crystal display panel according to an active matrix driving method, a pixel electrode and a switching element such as Thin Film Transistor (TFT) can be arrayed on the first substrate 1, and a common transparent electrode can be formed on the second substrate 2.

When the pixel electrode at the first substrate 1 is transparent, a transmission type liquid crystal display panel is formed. When the electrode is reflective, a reflective type liquid crystal display panel is formed. Of course, it is not necessary for the first substrate to be transparent in the case of the reflective type.

Furthermore, the present invention is not limited to these types of liquid crystal display panels and can be applied to transflective types of liquid crystal display panels, and even to in-plane switching (IPS) liquid crystal display panels.

Figure 4:
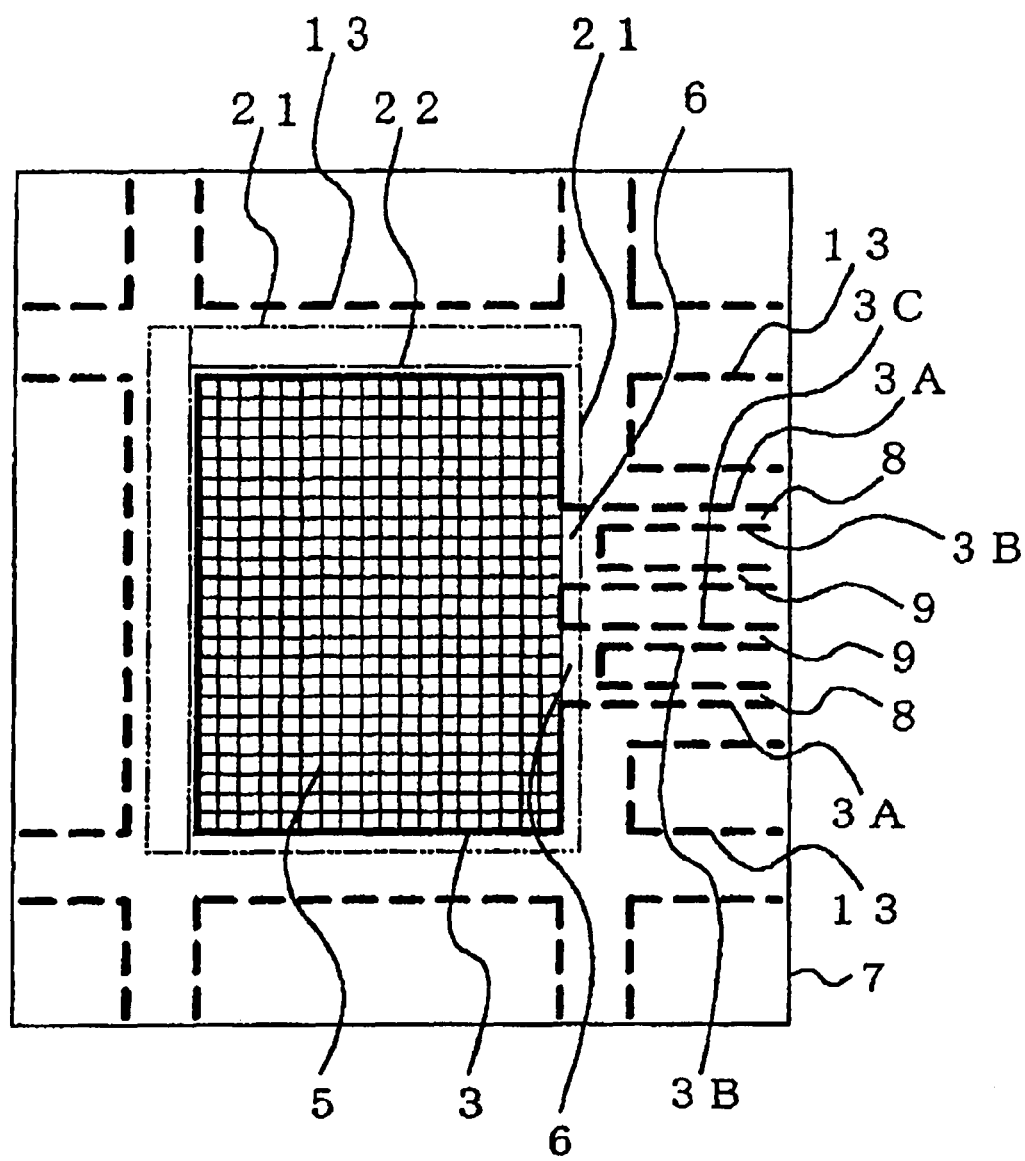
FIG. 4 is a plan view for illustrating another embodiment of the present invention.

FIG. 4 is a plan view for illustrating another embodiment of the present invention. In FIG. 4, similar reference numerals are used for designation of like or equivalent parts and portions as in FIG. 2, and redundant descriptions will be omitted.

In the embodiment illustrated in FIGS. 2 and 3, each member 13, 3A, 3B and 3C is shown in full lines. However in FIG. 4, each member 13, 3A, 3B and 3C is depicted in dashed lines which represent perforated holes. It is preferred that each member 13, 3A, 3B, and 3C is formed in full lines to have the supporting force necessary for supporting the two substrates. However, if there is sufficient supporting force, it is possible to form the members 13, 3A, 3B and 3C as dashed lines to allow easy extraction of air in the sealing process.

The advantage of these embodiments of the present invention is that when the first substrate 1 is attached to the second substrate 2 with seal material and subjected to a heating process, the thermally expanded air can be easily extracted from the substrates via air outlets 8 and 9. This ease in air extraction helps reduce the air pressure between the first substrate 1 and the second substrate 2 and as a result can help prevent deformation or cutoff of the seal member 3 caused by the air pressure.

What is claimed is:

1. A method for manufacturing a liquid crystal display panel, the method comprising:
    attaching a first substrate to a second substrate with a seal member and an auxiliary member to form said panel, said seal member forming an internal space and having an injection inlet for liquid crystal injection, said auxiliary member being arrayed around said seal member, wherein said seal member is formed with an air outlet forming member connected to said injection inlet, said air outlet forming member being extended toward a peripheral end of the panel, and said air outlet forming member is formed therein with an air outlet auxiliary member for forming an air outlet;
    forming a cut line between said seal member and said auxiliary member;
    cutting said panel along said cut line to traverse said air outlet forming member; and
    injecting liquid crystal through said injection inlet
    wherein said seal member, said auxiliary member and said air outlet are formed such that a plurality of air outlet paths between said injection inlet and a peripheral end of said liquid crystal display panel are unobstructed and straight.

2. The method as defined in claim 1, wherein said air outlet auxiliary member is positioned between the cut line and the peripheral end of the panel in order not to be cut when the panel is cut off.

3. The method as defined in claim 1, wherein said air outlet forming member is aligned parallel to said air outlet auxiliary member in order to maintain constant a gap therebetween.

4. The method as defined in claim 3, wherein the gap between said air outlet auxiliary member and said air outlet forming member is 2 mm or more but not more than 7 mm.

5. The method as defined in claim 3, wherein the gap between said peripheral end of said panel and the distal ends of both said air outlet auxiliary member and said air outlet forming member is not more than 3 mm.

6. The method as defined in claim 1, wherein said air outlet auxiliary member and said air outlet forming member extend toward a peripheral end of said panel.

7. The method as defined in claim 1, wherein said auxiliary member, said air outlet auxiliary member and said air outlet forming member formed at an external domain of the cut line, are all continuously formed as dashed lines.

8. The method as defined in claim 1, wherein said seal member, said auxiliary member, said air outlet auxiliary member and said air outlet forming member are all simultaneously formed and made of the same material.

9. The method as defined in claim 1, wherein there contains a plurality of said injection inlets and said air outlets.

10. A liquid crystal display panel manufactured by the method comprising:
   attaching a first substrate to a second substrate with a seal member and an auxiliary member to form said panel, said seal member forming an internal space and having an injection inlet for liquid crystal injection, said auxiliary member being arrayed around said seal member, wherein said seal member is formed with an air outlet forming member connected to said injection inlet, said air outlet forming member being extended toward a peripheral end of the panel, and said air outlet forming member is formed therein with an air outlet auxiliary member for forming an air outlet;
   forming a cut line between said seal member and said auxiliary member;
   cutting said panel along said cut line to traverse said air outlet forming member; and
   injecting liquid crystal through said injection inlet
   wherein said seal member, said auxiliary member and said air outlet are formed such that a plurality of air outlet paths between said injection inlet and a peripheral end of said liquid crystal display panel are unobstructed and straight.

11. A method for manufacturing a liquid crystal display panel, the method comprising:
   preparing a first substrate and a second substrate;
   forming a seal member, an auxiliary member, and air outlet forming members on one of said substrates, wherein said seal member forms an internal space and has an injection inlet for liquid crystal injection, said auxiliary member is arrayed wound said seal member, said air outlet forming members are formed with said auxiliary member and said air outlet forming members are connected to said injection inlet and extended toward a peripheral end of said panel;
   attaching said first substrate to said second substrate with said seal member and said auxiliary member to form said panel;
   positioning a cut line between said seal member and said auxiliary member;
   cutting said panel along said cut line; and
   injecting liquid crystal through said injection inlet
   wherein said seal member, said auxiliary member and said air outlet are formed such that a plurality of air outlet paths between said injection inlet and a peripheral end of said liquid crystal display panel are unobstructed and straight.

12. The method as defined in claim 11, wherein air outlet auxiliary members are further formed on one of said substrates within said air outlet forming members.

13. A method for manufacturing a liquid crystal display panel, the method comprising:
   attaching a first substrate to a second substrate wit a seal member and an auxiliary member to form said panel, said seal member forming an internal space and having an injection inlet for liquid crystal injection, said auxiliary member being arrayed around said seal member, wherein said seal member is formed with an air outlet forming member connected to said injection inlet, said air outlet forming member being extended toward a peripheral end of the panel, and said air outlet forming member is formed therein with an air outlet auxiliary member for forming an air outlet;
   forming a cut line between said seal member and said auxiliary member;
   cutting said panel along said cut line to traverse said air outlet forming member; and
   injecting liquid crystal through said injection inlet,
   wherein said air outlet auxiliary member is positioned between the cut line and the peripheral end of the panel in order not to be cut when the panel is cut off.

14. The method as defined in claim 13, wherein said air outlet forming member is aligned parallel to said air outlet auxiliary member in order to maintain constant a gap therebetween.

15. The method as defined in claim 13, wherein said air outlet auxiliary member and said air outlet forming member extend toward a peripheral end of said panel.

16. The method as defined in claim 13, wherein said seal member, said auxiliary member, said air outlet auxiliary member and said air outlet forming member are all simultaneously formed and made of the same material.

17. The method as defined in claim 13, wherein there contains a plurality of said injection inlets and said air outlets.

18. A method for manufacturing a liquid crystal display panel, the method comprising:
   attaching a first substrate to a second substrate with a seal member and an auxiliary member to form said panel, said seal member forming an internal space and having an injection inlet for liquid crystal injection, said auxiliary member being arrayed around said seal member, wherein said seal member is formed with an air outlet forming member connected to said injection inlet, said air outlet forming member being extended toward a peripheral end of the panel, and said air outlet forming member is formed therein with an air outlet auxiliary member for forming an air outlet;
   forming a cut line between said seal member and said auxiliary member;
   cutting said panel along said cut line to traverse said air outlet forming member; and
   injecting liquid crystal through said injection inlet,
   wherein said auxiliary member, said air outlet auxiliary member and said air outlet forming member formed at an external domain of the cut line, are all continuously formed as dashed lines.

19. The method as defined in claim 18, wherein said air outlet forming member is aligned parallel to said air outlet auxiliary member in order to maintain constant a gap therebetween.

20. The method as defined in claim 18, wherein said air outlet auxiliary member and said air outlet forming member extend toward a peripheral end of said panel.

21. The method as defined in claim 18, wherein said seal member, said auxiliary member, said air outlet auxiliary member and said air outlet forming member are all simultaneously formed and made of the same material.

22. The method as defined in claim 18, wherein there contains a plurality of said injection inlets and said air outlets.

23. A method for manufacturing a liquid crystal display panel, the method comprising:
   attaching a first substrate to a second substrate with a seal member and an auxiliary member to form said panel, said seal member forming an internal space and having an injection inlet for liquid crystal injection, said auxiliary member being arrayed around said seal member, wherein said seal member is formed with an air outlet forming member connected to said injection inlet, said air outlet forming member being extended toward a peripheral end of the panel, and said air outlet forming member is formed therein wit an air outlet auxiliary member for forming an air outlet;

forming a cut line between said seal member and said auxiliary member;

cutting said panel along said cut line to traverse said air outlet forming member; and injecting liquid crystal trough said injection inlet, wherein said air outlet forming member is aligned parallel to said air outlet auxiliary member in order to maintain constant a gap therebetween, and the gap between said air outlet auxiliary member and said air outlet forming member is 2 mm or more but not more than 7 mm.

24. A method for manufacturing a liquid crystal display panel, the method comprising:

attaching a first substrate to a second substrate with a seal member and an auxiliary member to form said panel, said seal member forming an internal space and having an injection inlet for liquid crystal injection, said auxiliary member being arrayed around said seal member, wherein said seal member is formed with an air outlet forming member connected to said injection inlet, said air outlet forming member being extended toward a peripheral end of the panel, and said air outlet forming member is formed therein with an air outlet auxiliary member for forming an air outlet;

forming a cut line between said seal member and said auxiliary member;

cutting said panel along said cut line to traverse said air outlet forming member; and injecting liquid crystal trough said injection inlet, wherein said air outlet forming member is aligned parallel to said air outlet auxiliary member in order to maintain constant a gap therebetween, and the gap between said peripheral end of said panel and the distal ends of both said air outlet auxiliary member and said air outlet forming member is not more than 3 mm.

* * * * *

UNITED STATES PATENT AND TRADEMARK OFFICE
CERTIFICATE OF CORRECTION

PATENT NO. : 7,136,134 B2
APPLICATION NO. : 10/629185
DATED : November 14, 2006
INVENTOR(S) : Hidefumi Yoshizoe It is certified that error appears in the above-identified patent and that said Letters Patent is hereby corrected as shown below:

Claim 11, Col. 7, line 36, "wound" should be --around--.

Claim 24, Col. 10, line 13, "trough" should be --through--.

Signed and Sealed this

Eighth Day of May, 2007

JON W. DUDAS
*Director of the United States Patent and Trademark Office*